US012587514B2

(12) United States Patent
Synstelien et al.

(10) Patent No.: US 12,587,514 B2
(45) Date of Patent: Mar. 24, 2026

(54) ROUTING PACKET TO TCP TUNNEL CLIENT PROGRAM

(71) Applicant: ReadyLinks Inc., Chanhassen, MN (US)

(72) Inventors: Alec R. Synstelien, Chanhassen, MN (US); Justin L. Synstelien, Chanhassen, MN (US); Brady M. Synstelien, Chanhassen, MN (US); Garrett D. Synstelien, Chanhassen, MN (US); Larry D. Synstelien, Chanhassen, MN (US)

(73) Assignee: ReadyLinks Inc., Chanhassen, MN (US)

( * ) Notice: Subject to any disclaimer, the term of this patent is extended or adjusted under 35 U.S.C. 154(b) by 2 days.

(21) Appl. No.: 18/453,934

(22) Filed: Aug. 22, 2023

(65) Prior Publication Data

US 2024/0080307 A1 Mar. 7, 2024

Related U.S. Application Data

(60) Provisional application No. 63/401,373, filed on Aug. 26, 2022.

(51) Int. Cl.
| | |
|---|---|
| *H04L 9/40* | (2022.01) |
| *H04L 12/46* | (2006.01) |
| *H04L 69/16* | (2022.01) |

(52) U.S. Cl.
CPC ...... *H04L 63/0478* (2013.01); *H04L 12/4633* (2013.01); *H04L 63/166* (2013.01); *H04L 69/16* (2013.01)

(58) Field of Classification Search
CPC ............. H04L 12/4633; H04L 63/0478; H04L 63/166; H04L 69/16
USPC ........................................................ 713/153
See application file for complete search history.

(56) References Cited

U.S. PATENT DOCUMENTS

| | | | |
|---|---|---|---|
| 7,181,766 B2 | 2/2007 | Bendinelli et al. | |
| 7,856,021 B2 | 12/2010 | Hasegawa et al. | |
| 8,332,464 B2 | 12/2012 | Dispensa et al. | |
| 8,477,771 B2 | 7/2013 | Biswas et al. | |
| 11,431,761 B2 * | 8/2022 | Loiseau | H04L 65/102 |

(Continued)

OTHER PUBLICATIONS

"Chinese Application Serial No. 202380062002.0, Notification to Make Rectification mailed Mar. 24, 2025", with English translation, 2 pages.

(Continued)

*Primary Examiner* — David P Zarka
(74) *Attorney, Agent, or Firm* — Schwegman Lundberg & Woessner, P.A.

(57) ABSTRACT

A system and method for cloud-based control of network devices is provided. An encrypted connection is established by a network access device with a host using a transmission control protocol (TCP). The network access device determines that a packet to be transmitted to the host is to be routed via a TCP tunnel client program. Based on the determination, the network access device sends the packet to the TCP tunnel client program. The TCP tunnel client program encrypts, signs, and fragments the packet, and the network access device sends the encrypted packet to a remote endpoint associated with the host using the TCP.

17 Claims, 4 Drawing Sheets

(56) References Cited

U.S. PATENT DOCUMENTS

| | | | | |
|---|---|---|---|---|
| 2003/0014623 | A1* | 1/2003 | Freed | H04L 9/40 |
| | | | | 713/150 |
| 2003/0195919 | A1* | 10/2003 | Watanuki | H04L 67/63 |
| | | | | 718/105 |
| 2008/0222166 | A1* | 9/2008 | Hultgren | G06F 16/248 |
| 2008/0285575 | A1 | 11/2008 | Biswas et al. | |
| 2009/0271504 | A1* | 10/2009 | Ginter | H04L 63/02 |
| | | | | 709/220 |
| 2011/0145593 | A1* | 6/2011 | Auradkar | H04L 9/0833 |
| | | | | 713/189 |
| 2012/0005369 | A1 | 1/2012 | Capone et al. | |
| 2012/0278878 | A1* | 11/2012 | Barkie | H04L 63/0485 |
| | | | | 726/15 |
| 2013/0332724 | A1* | 12/2013 | Walters | H04L 63/0272 |
| | | | | 713/153 |
| 2015/0317169 | A1* | 11/2015 | Sinha | G06F 9/4416 |
| | | | | 713/2 |
| 2018/0167810 | A1* | 6/2018 | Wu | H04L 63/0876 |
| 2018/0183763 | A1* | 6/2018 | Glazemakers | H04L 63/0272 |
| 2020/0044954 | A1* | 2/2020 | Raut | H04L 45/50 |
| 2022/0174129 | A1* | 6/2022 | Penz | H04L 67/563 |
| 2023/0224361 | A1* | 7/2023 | Karuppannan | H04L 67/561 |
| | | | | 709/223 |

OTHER PUBLICATIONS

"International Application Serial No. PCT/US2023/072668, International Preliminary Report on Patentability mailed Mar. 13, 2025", 6 pgs.
"International Application Serial No. PCT/US2023/072668, International Search Report mailed Dec. 18, 2023", 4 pgs.
"International Application Serial No. PCT/US2023/072668, Written Opinion mailed Dec. 18, 2023", 4 pgs.
"European Application Serial No. 23773083.3, Response to Communication pursuant to Rules 161(2) and 162 EPC filed Oct. 2, 2025", w/ claims, 6 pgs.

* cited by examiner

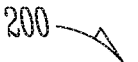

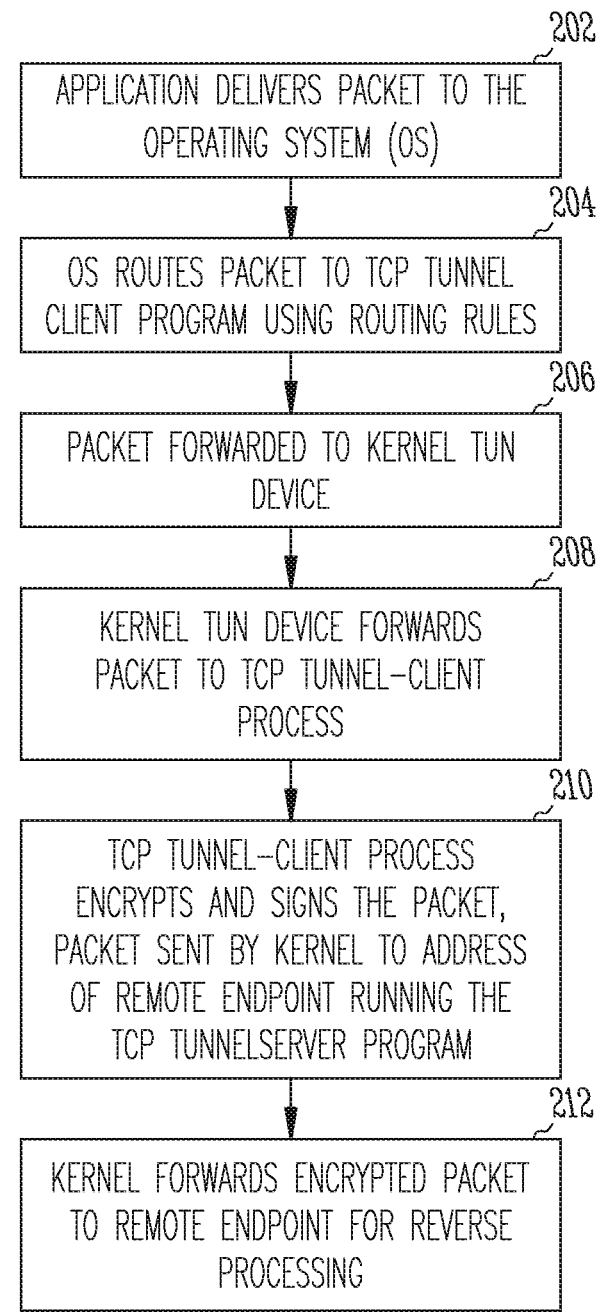

*200*

202

APPLICATION DELIVERS PACKET TO THE OPERATING SYSTEM (OS)

204

OS ROUTES PACKET TO TCP TUNNEL CLIENT PROGRAM USING ROUTING RULES

206

PACKET FORWARDED TO KERNEL TUN DEVICE

208

KERNEL TUN DEVICE FORWARDS PACKET TO TCP TUNNEL-CLIENT PROCESS

210

TCP TUNNEL-CLIENT PROCESS ENCRYPTS AND SIGNS THE PACKET, PACKET SENT BY KERNEL TO ADDRESS OF REMOTE ENDPOINT RUNNING THE TCP TUNNELSERVER PROGRAM

212

KERNEL FORWARDS ENCRYPTED PACKET TO REMOTE ENDPOINT FOR REVERSE PROCESSING

*Fig.2*

ROUTING PACKET TO TCP TUNNEL CLIENT PROGRAM

CLAIM OF PRIORITY AND INCORPORATION BY REFERENCE

The present application claims the benefit under 35 U.S.C. § 119(e) of U.S. Provisional Patent Application 63/401,373, filed Aug. 26, 2022, the disclosure of which is hereby incorporated by reference herein in its entirety.

TECHNICAL FIELD

This document relates generally to computer networking, and more particularly to systems and methods for cloud-based control of network devices.

BACKGROUND

Cloud-based networks include multiple devices or nodes that may have the ability to communicate with each other. These devices or nodes may reside across isolated networks in geographically separate regions. Control, monitoring and security of these devices or nodes may be difficult and time-consuming due to firewalls, addressing issues, and the time-consuming nature of logging in to unique devices residing in geographically and logically separated networks to execute administrative and monitoring tasks.

Thus, there is a need in the art for a system that enables devices to securely form encrypted connections and enable quick, easy, and secure control and monitoring of devices that may reside across isolated networks.

SUMMARY

A system and method for cloud-based control and monitoring of network devices is provided. The present subject matter provides hardware and software for setting up and controlling a host device on a network. An encrypted connection is established by a network access device with a host using transmission control protocol (TCP). The network access device determines that a packet to be transmitted to the host is to be routed via a TCP tunnel client program. Based on the determination, the network access device sends the packet to the TCP tunnel client program. The TCP tunnel client program encrypts, signs, and fragments the packet, and the network access device sends the encrypted packet to a remote endpoint associated with the host using the TCP.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present patent application.

FIG. 2 is a flow diagram showing an example of a method for cloud-based control of network devices, according to one embodiment of the present subject matter.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

Figure 1:
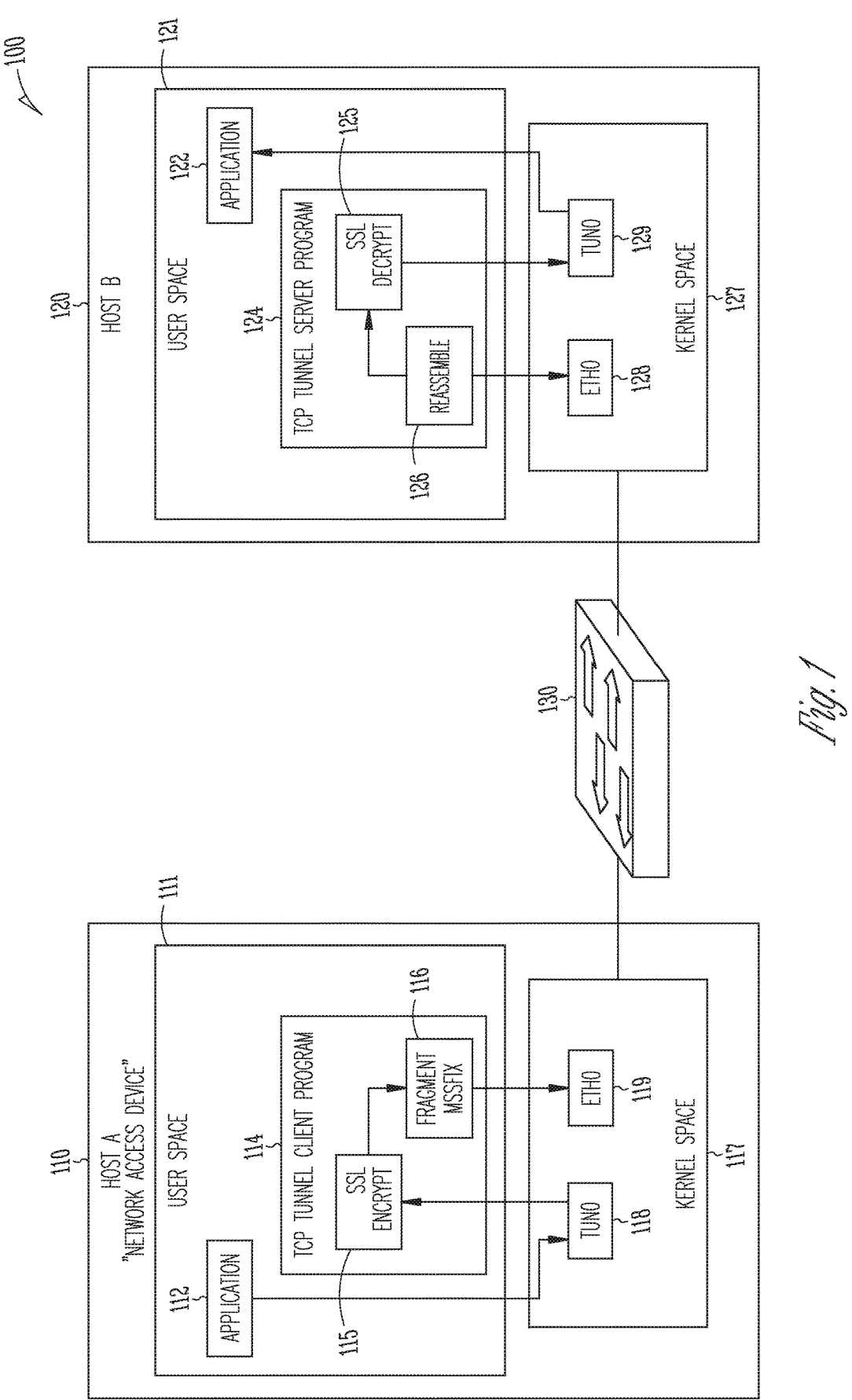
FIG. 1 demonstrates an example of a system for cloud-based control of network devices, according to one embodiment of the present subject matter.

FIG. 1 demonstrates an example of a system for cloud-based control of network devices, according to one embodiment of the present subject matter. In various embodiments, the system 100 may include a network access device 110 configured to establish an encrypted connection with a host 120 using a transmission control protocol (TCP) 130. The network access device 110 may determine that a packet to be transmitted to the host 120 is to be routed via a TCP tunnel client program 114. Based on the determination, the network access device 110 sends the packet to the TCP tunnel client program 114. The TCP tunnel client program 114 encrypts 115, signs, and fragments 116 the packet, and the network access device 110 sends the encrypted packet to a remote endpoint associated with the host 120 using the TCP 130.

In various embodiments, the network access device may include a switch. In various embodiments, the network access device may include a device with the ability to create a virtual network interface. In various embodiments, the network access device may include a TUN device. In various embodiments, the network access device may include a virtual internet protocol point-to-point interface with the ability to process network packets and configured to connect to a host or server running a TCP tunnel program. In various embodiments, the network access device TCP tunnel program may be configured to connect to a host or server running a TCP tunnel server program. In various embodiments, the network access device TCP tunnel program may be configured to connect to a host or server running a TCP tunnel server program that is reachable only via a dedicated TCP port. In various embodiments, the TCP tunnel server includes a cloud-based server or any other device which may create a virtual network interface. In various embodiments, the network access device TCP tunnel program may be configured to connect to a host or server running a TCP tunnel server program that may be reachable only via TCP port 443.

In various embodiments, the network access device TCP tunnel client program transfers packets through a load-balancing module. In various embodiments, the load-balancing module includes load-balance logic. Such load-balance logic may be based on parameters, including but not limited to one or more of, geography, latency, host health, or host server response time. Among other things, the load balance logic directs one or more packets to a specific host running a TCP tunnel server program, enabling multiple hosts to run the TCP tunnel server program in parallel. In various applications, the load-balancing module enables different devices executing the TCP tunnel client program to connect to different hosts based on parameters, including, but not limited to, one or more of, latency, host health, geographic region, or host server response time. Those of skill in the art upon reading and understanding the disclosure will appreciate other parameters that may be used without departing from the scope of the present subject matter.

Upon establishment of an encrypted connection between a device running TCP tunnel client program and a device running the TCP tunnel server program as referenced in FIG. 1, a device may interact with network access device 110 utilizing an API that may be accessible on the network access device via HTTP methods described by RFC 2616 protocol over connection 130. A device not running the TCP tunnel client or TCP tunnel server program may interact with a device running a TCP tunnel client program by sending identifiers as part of an HTTP or HTTPs interaction to a publicly accessible API endpoint hosted on a device running a TCP tunnel server program which validates the entity sending the HTTP or HTTPs interaction may communicate with network access device 110 over connection 130 by validating the identifiers included in HTTP or HTTPs inter-action. These identifiers may be valuable as they may centrally control varying levels of access to network access device 110 running the TCP tunnel client program. The I-ITTP or HTTPs interaction by an entity not running the TCP tunnel client or TCP tunnel server program may be logged to a database by a program monitoring the publicly accessible API endpoint. This allows entities to log interactions with devices running the TCP tunnel client program.

In various embodiments, the network access device includes a TCP tunnel client. In some embodiments, the network access device includes a switch connecting to a TCP tunnel server, such as host 120, which may be a server in the cloud. According to various embodiments, the net-work access device 110 includes user space 111 including application 112 and kernel space 117 having tun0 118 and eth0 119. In various embodiments, the host 120 includes user space 121 including application 122 and kernel space 127 having tun0 129 and eth0 128. The host 120, such as a server in the cloud or cloud-based server, may also include a TCP tunnel-server program 124 for reassembling 126 and decrypting 125 messages from the network access device 110, in various embodiments.

Various embodiments of the present subject matter use TCP as the underlying communication protocol for estab-lishing encrypted connections between the network access device 110 and the host 120, or server. TCP provides a plurality of benefits over other communications protocols, in various embodiments. For example, TCP requires less over-head and administrative work to manage communications or to set up a dashboard, and connections can be re-used without the need to reestablish the connection. In some embodiments, TCP al lows for connections to be established on more networks than other protocols because hypertext transfer protocol secure (HTTPs), a commonly used proto-col, uses TCP. TCP may use a secure sockets layer (SSL) as a default encryption protocol, which is a standard commonly used for network communications, in various embodiments.

TCP is a connection-oriented protocol, such that the com-municating devices should establish a connection before transmitting data and should close the connection after transmitting the data. TCP is reliable as it guarantees the delivery of data to the destination router, using acknowl-edgements (ACKs) in various embodiments. TCP provides extensive error-checking mechanisms by providing flow control and acknowledgment of data. Sequencing of data is a feature of Transmission Control Protocol (TCP). this means that packets arrive in order at the receiver, and retransmission of lost packets is possible in TCP. TCP has a (20-60) bytes variable length header. In addition, TCP is heavy-weight, and uses handshakes such as SYN, ACK, and SYN-ACK. Further, TCP is used by HTTP, FTP, SMTP and Telnet protocols. The TCP connection is a byte stream and has relatively low overhead, in various embodiments. Other communication protocols can be used without departing from the scope of the present subject matter.

FIG. 2 is a flow diagram showing an example of a method for cloud-based control of network devices, according to one embodiment of the present subject matter. According to various embodiments, the method 200 includes an applica-tion delivering a packet to the Operating System (OS), at step 202. At step 204 the OS routes the packet to TCP tunnel client program and at step 206 the packet is forwarded to a kernel tun device. At step 208, the kernel tun device for-wards the packet to a TCP tunnel—client process, and at step 210 the TCP tunnel-client process encrypts and signs the packet, and the packet is sent by the kernel tun device to an address of a remote endpoint running the TCP tunnel-server program. At step 212, the kernel tun device forwards the encrypted packet to the remote endpoint for reverse pro-cessing, in various embodiments.

Figure 3:
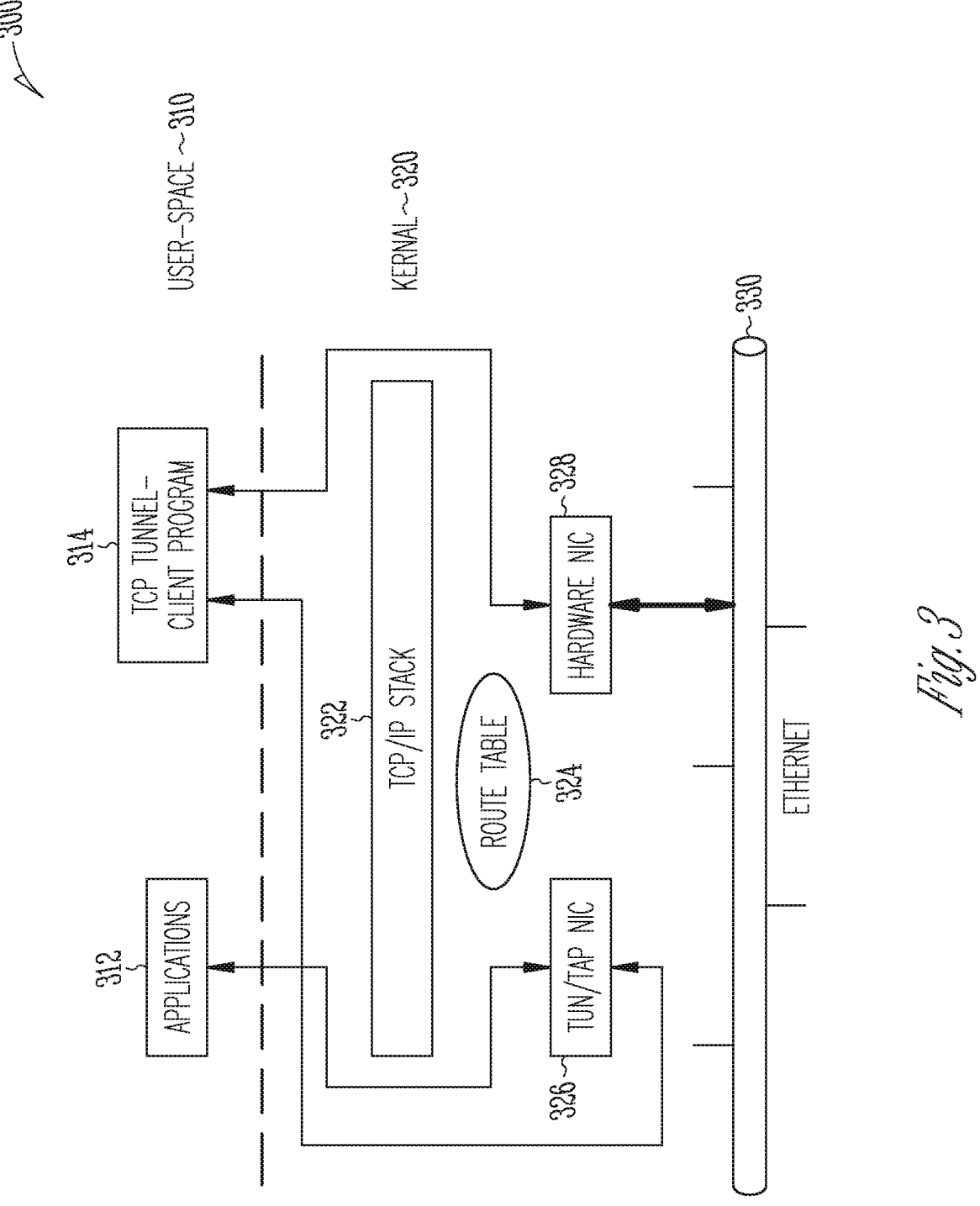
FIG. 3 demonstrates an example of a digital communication port configured to communicate over a network, according to one embodiment of the present subject matter.

FIG. 3 demonstrates an example of a digital communi-cation port, or client 300, configured to communicate over a network, according to one embodiment of the present sub-ject matter. The client 300 includes a networking stack, in various embodiments, which may include a user-space 310 and a kernel 320. The user-space 310 may include applica-tions 312 and a TCP tunnel-client program 314, in various embodiments. The kernel 320 may include a TCP/IP stack 322, a route table 324, a tun/tap network interface card (NEC) 326, and a hardware MC 328, in various embodi-ments. The hardware NIC 328 may communicate over a network, such as an ethernet network 330, in some embodi-ments. According to various embodiments, the client 300 may include a resistor-inductor (RL) switch or a temperature sensor. Other types of client devices may be used without departing from the scope of the present subject matter.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a stand-alone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be imple-mented mechanically, electronically, or any suitable combi-nation thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled, A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations, Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-3 are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," While yet another combination produces a server computer for use within a cloud computing architecture. Not all combinations of such software and hardware architectures are presented here as those of skill in the art can readily understand how to implement the invention in different contexts from the disclosure contained herein.

Example Machine Architecture and Machine-Readable Medium

Figure 4:
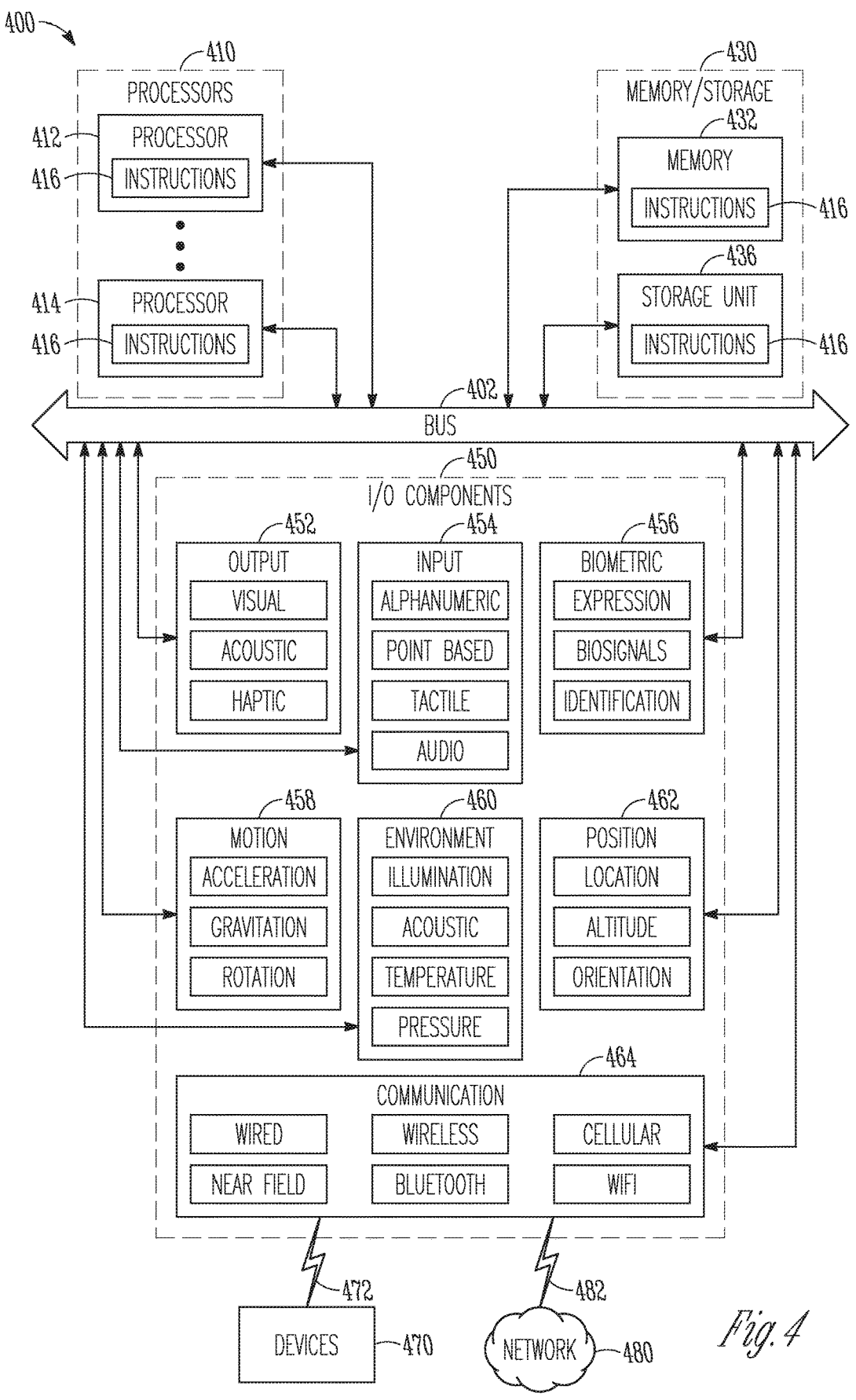
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 416 (e.g., software, a program, an application, an apples, an app, or other executable code) for causing the machine 400 to perform any one or more of the methodologies discussed herein may be executed. For example, the instructions may cause the machine to execute the flow diagram of FIG. 2. Additionally, or alternatively, the instructions may implement one or more of the devices and/or components of FIGS. 1 and 3. The instructions transform the general, non-programmed machine into a particular machine programmed to carry out the described and illustrated functions in the manner described. In alternative embodiments, the machine 400 operates as a stand-alone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a personal digital assistant (PDA), or any machine capable of executing the instructions 416, sequentially or otherwise, that specify actions to be taken by machine 400, Further, while only a single machine 400 is illustrated, the term "machine" shall also be taken to include a collection of machines 400 that individually or jointly execute the instructions 416 to perform any one or more of the methodologies discussed herein.

The machine 400 may include processors 410, memory 430, and I/O components 450, which may be configured to communicate with each other such as via a bus 402. In an example embodiment, the processors 410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 412 and processor 414 that may execute instructions 416. The term "processor" is intended to include multi-core processor that may comprise two or more independent processors (sometimes referred to as "cores") that may execute instructions contemporaneously. Although FIG. 4 shows multiple processors, the machine 400 may include a single processor with a single core, a single processor with multiple cores (e.g., a multi-core process), multiple processors with a single core, multiple processors with multiples cores, or any combination thereof.

The memory/storage 430 may include a memory 432, such as a main memory, or other memory storage, and a storage unit 436, both accessible to the processors 410 such as via the bus 402. The storage unit 436 and memory 432 store the instructions 416 embodying any one or more of the methodologies or functions described herein. The instructions 416 may also reside, completely or partially, within the memory 432, within the storage unit 436, within at least one of the processors 410 (e.g., within the processor's cache memory), or any suitable combination thereof, during execution thereof by the machine 400. Accordingly, the memory 432, the storage unit 436, and the memory of processors 410 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 416. The term "machine-readable medium" shall also be taken to include any medium, or combination of multiple media, that is capable of storing instructions (e.g., instructions 416) for execution by a machine (e.g., machine 400), such that the instructions, when executed by one or more processors of the machine 400 (e.g., processors 410), cause the machine

400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 450 may include a wide variety of components to receive input, provide output, produce output, transmit information, exchange information, capture measurements, and so on. The specific I/O components 450 that are included in a particular machine will depend on the type of machine. For example, portable machines such as mobile phones will likely include a touch input device or other such input mechanisms, while a headless server machine will likely not include such a touch input device. It will be appreciated that the I/O components 450 may include many other components that are not shown in FIG. 4. The I/O components 450 are grouped according to functionality merely for simplifying the following discussion and the grouping is in no way limiting. In various example embodiments, the I/O components 450 may include output components 452 and input components 454. The output components 452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 454 may include alphanumeric input components (e.g., a keyboard, a touch screen configured to receive alphanumeric input, a photo optical keyboard, or other alphanumeric input components), point based input components (e.g., a mouse, a touchpad, a trackball, a joystick, a motion sensor, or other pointing instrument), tactile input components (e, g., a physical button, a touch screen that provides location and/or force of touches or touch gestures, or other tactile input components), audio input components (e.g., a microphone), and the like.

In further example embodiments, the I/O components 450 may include biometric components 456, motion components 458, environmental components 460, or position components 462 among a wide array of other components. For example, the biometric components 456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 458 may include acceleration sensor components (e.g., accelerometer), gravitation sensor components, rotation sensor components (e.g., gyroscope), and so forth. The environmental components 460 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 462 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 450 may include communication components 464 operable to couple the machine 400 to a network 480 or devices 470 via coupling 482 and coupling 472 respectively. For example, the communication components 464 may include a network interface component or other suitable device to interface with the network 480. In further examples, communication components 464 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 470 may be another machine or any of a wide variety of peripheral devices (e.g., a peripheral device coupled via a Universal Serial Bus (USB)).

Moreover, the communication components 464 may detect identifiers or include components operable to detect identifiers. For example, the communication components 464 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF413, Ultra Code, UCC RSS-2D bar code, and other optical codes), or acoustic detection components (e.g., microphones to identify tagged audio signals). In addition, a variety of information may be derived via the communication components 464, such as, location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 480 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 480 or a portion of the network 480 may include a wireless or cellular network and the coupling 482 may be a Code Division Multiple Access (CDMA) connection, a Global System for Mobile communications (GSM) connection, or other type of cellular or wireless coupling. In this example, the coupling 482 may implement any of a variety of types of data transfer technology, such as Single Carrier Radio Transmission Technology (1×RTT), Evolution-Data. Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UNITS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 416 may be transmitted or received over the network 480 using a transmission medium via a network interface device (e.g., a network interface component included in the communication components 464) and utilizing any one of a number of well-known transfer protocols (e.g., hypertext transfer protocol (HTTP)). Similarly, the instructions 416 may be transmitted or received using a transmission medium via the coupling 472 (e.g., a peer-to-peer coupling) to devices 470. The term "transmission medium" shall be taken to include any intangible medium that is capable of storing, encoding, or carrying instructions 416 for execution by the machine 400, and includes digital or analog communications signals or other intangible medium to facilitate communication of such software.

OTHER NOTES AND EXAMPLES

Example 1 is a computer-implemented method for control of network devices. The method includes establishing, by a network access device, an encrypted connection with a host using a transmission control protocol (TCP), determining, by the network access device, that a packet to be transmitted to the host is to be routed via a TCP tunnel client program, sending, by the network access device based on the determination, the packet to the TCP tunnel client program, encrypting, signing, and fragmenting, by the TCP tunnel client program, the packet to produce an encrypted packet with instructions for control of network devices, and sending, by the network access device using the TCP, the encrypted packet to a remote endpoint associated with the host.

In Example 2, the subject matter of Example 1 optionally includes wherein the network access device is a device with ability to create a virtual network interface.

In Example 3, the subject matter of Example 2 optionally includes wherein the network access device is a switch.

In Example 4, the subject matter of Example 2 optionally includes wherein the network access device is a TUN device.

In Example 5, the subject matter of Example 2 optionally includes wherein the device includes a virtual IP point-to-point interface with the ability to process network packets and is configured to connect to a host or server running a TCP tunnel program.

In Example 6, the subject matter of any of the preceding Examples optionally includes wherein the network access device TCP tunnel program is configured to connect to a host running a TCP tunnel server program.

In Example 7, the subject matter of Example 6 optionally includes wherein the TCP tunnel server program may only be reachable via TCP port 443.

In Example 8, the subject matter of any of the preceding Examples optionally includes wherein the encrypted packet traverses through load-balance logic.

In Example 9, the subject matter of Example 8 optionally includes wherein the load-balance logic includes one or more of geography, latency, host health, or host server response time.

In Example 10, the subject matter of Example 9 optionally further includes directing the encrypted packet to a specific host running a TCP tunnel server program and enabling multiple hosts to run the TCP tunnel server program in parallel.

In Example 11, the subject matter of Example 10 optionally includes wherein the TCP tunnel server program is configured to execute on a TCP tunnel server including a cloud-based server or any device which may create a virtual network interface.

Example 12 is a system including a network access device comprising one or more processors and a data storage system in communication with the one or more processors, wherein the data storage system comprises instructions thereon that, when executed by the one or more processors, causes the one or more processors to: establish an encrypted connection with a host using a transmission control protocol (TCP); determine that a packet to be transmitted to the host is to be routed via a TCP tunnel client program; send, based on the determination, the packet to the TCP tunnel client program; encrypt, sign, and fragment, using the TCP tunnel client program, the packet to produce an encrypted packet with instructions for control of network devices; and send, using the TCP, the encrypted packet to a remote endpoint associated with the host.

In Example 13, the subject matter of Example 12 optionally includes wherein the network access device is a device with ability to create a virtual network interface.

In Example 14, the subject matter of Example 13 optionally includes wherein the network access device is a switch.

In Example 15, the subject matter of Example 13 optionally includes wherein the network access device is a TUN device.

In Example 16, the subject matter of Example 13 optionally includes wherein the network access device includes a virtual IP point-to-point interface with the ability to process network packets and is configured to connect to a host or server running a TCP tunnel server program.

In Example 17, the subject matter of Example 16 optionally includes wherein the TCP tunnel server program is configured to execute on a TCP tunnel server including a cloud-based server.

In Example 18, the subject matter of Example 16 optionally includes wherein the network access device TCP tunnel program is configured to automatically connect to a host running the TCP tunnel server program.

In Example 19, the subject matter of any of Examples 12 through 18 optionally includes wherein the encrypted packet traverses through load-balance logic.

In Example 20, the subject matter of Example 19 optionally includes wherein the load-balance logic includes one or more of geography, latency, host health, or host server response time.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. This application is intended to cover adaptations or variations of the present subject matter. It is to be understood that the above description is intended to be illustrative, and not restrictive. The scope of the present subject matter should be determined with reference to the appended claims, along with the full scope of equivalents to which such claims are entitled.

The invention claimed is:

1. A computer-implemented method for control of network devices, the method comprising:
   establishing, by a network access device including a virtual internet protocol (IP) point-to-point interface configured to process network packets, an encrypted connection with a host using a transmission control protocol (TCP), wherein the network access device is configured to be accessed using an application programming interface (API) and to connect to a host or server running a TCP tunnel program;
   determining, by the network access device, that a packet to be transmitted to the host is to be routed via the TCP tunnel client program;
   sending, by the network access device based on the determination, the packet to the TCP tunnel client program;
   encrypting, signing, and fragmenting, by the TCP tunnel client program, the packet to produce an encrypted packet with instructions for control of network devices; and
   sending, by the network access device using the TCP, the encrypted packet to a remote endpoint associated with the host.

2. The method of claim 1, wherein the network access device is a switch.

3. The method of claim 1, wherein the network access device is a tunnel (TUN) device.

4. The method of claim 1, wherein the TCP tunnel client program is configured to connect to the host running a TCP tunnel server program.

5. The method of claim 4, wherein the TCP tunnel server program is only reachable via TCP port 443.

6. The method of claim 1, wherein the encrypted packet traverses through load-balance logic.

7. The method of claim 6, wherein the load-balance logic includes one or more of geography, latency, host health, or host server response time.

8. The method of claim 7, further comprising directing the encrypted packet to a specific host running a TCP tunnel server program and enabling multiple hosts to run the TCP tunnel server program in parallel.

9. The method of claim 8, wherein the TCP tunnel server program is configured to execute on a TCP tunnel server including a cloud-based server or any device which may create a virtual network interface.

10. A system comprising:
    a network access device including a virtual internet protocol (IP) point-to-point interface configured to process network packets), wherein the network access device is configured to be accessed using an application programming interface (API) and to connect to a host or server running a TCP tunnel program, the network access device comprising one or more processors and a data storage system in communication with the one or more processors, wherein the data storage system comprises instructions thereon that, when executed by the one or more processors, causes the one or more processors to:

establish an encrypted connection with a host using a transmission control protocol (TCP);

determine that a packet to be transmitted to the host is to be routed via the TCP tunnel client program;

send, based on the determination, the packet to the TCP tunnel client program;

encrypt, sign, and fragment, using the TCP tunnel client program, the packet to produce an encrypted packet with instructions for control of network devices; and send, using the TCP, the encrypted packet to a remote endpoint associated with the host.

11. The system of claim 10, wherein the network access device is a switch.

12. The system of claim 10, wherein the network access device is a tunnel (TUN) device.

13. The system of claim 10, wherein the network access device is configured to connect to a host or server running a TCP tunnel server program.

14. The system of claim 13, wherein the TCP tunnel server program is configured to execute on a TCP tunnel server including a cloud-based server.

15. The system of claim 13, wherein the TCP tunnel client program is configured to connect to the host running the TCP tunnel server program.

16. The system of claim 10, wherein the encrypted packet traverses through load-balance logic.

17. The system of claim 16, wherein the load-balance logic includes one or more of geography, latency, host health, or host server response time.

* * * * *